United States Patent
Farminer et al.

(10) Patent No.: US 11,528,909 B2
(45) Date of Patent: Dec. 20, 2022

(54) METHOD OF CONTROLLING NEMATODES IN AGRICULTURAL CROPS

(71) Applicants: Kenneth Farminer, Midland, MI (US); Robert McKellar, Midland, MI (US)

(72) Inventors: Kenneth Farminer, Midland, MI (US); Robert McKellar, Midland, MI (US)

(*) Notice: Subject to any disclaimer, the term of this patent is extended or adjusted under 35 U.S.C. 154(b) by 12 days.

(21) Appl. No.: 17/340,448

(22) Filed: Jun. 7, 2021

(65) Prior Publication Data

US 2021/0378245 A1    Dec. 9, 2021

Related U.S. Application Data

(60) Provisional application No. 63/036,608, filed on Jun. 9, 2020.

(51) Int. Cl.
*A01N 55/00* (2006.01)

(52) U.S. Cl.
CPC .................................. *A01N 55/00* (2013.01)

(58) Field of Classification Search
CPC ...................................................... A01N 55/00
See application file for complete search history.

(56) References Cited

FOREIGN PATENT DOCUMENTS

WO    WO2012160385    * 11/2012    ............. A01N 55/00

* cited by examiner

*Primary Examiner* — Trevor Love

(57) ABSTRACT

A method of controlling nematodes in agricultural crops, said method comprising contacting said nematodes with an aqueous solution of 3-(trimethoxysilyl)-propyldimethyloctadecyl ammonium chloride, and, a surfactant.

12 Claims, No Drawings

METHOD OF CONTROLLING NEMATODES IN AGRICULTURAL CROPS

BACKGROUND OF THE INVENTION

Nematodes are a diverse animal phylum inhabiting a broad range of environments. Taxonomically, they are classified along with insects and other molting animals.

Nematodes have successfully adapted to nearly every ecosystem from marine to fresh water, and soils, from the polar regions to the tropics, as well as the highest to the lowest of elevations.

Nematodes are very small, slender worms typically about to 5 to 100 micrometers thick, and 0.1 to 2.5 mm long. The smallest nematodes are microscopic, while free-living species can reach as much as 5 centimeters (approximately 2 inches).

Plant parasitic nematodes include several groups causing severe crop losses and several phyto-parasitic nematode species cause histological damages to roots, including the formation of visible galls which are useful characters for their diagnosis in the field. Some nematode species transmit plant viruses through their feeding activity on roots.

Depending on the species, a nematode may be beneficial or detrimental to plant health. From agricultural and horticulture perspectives, the two categories of nematodes are predatory, which kill garden pests such as cutworms and corn earworm moths, and the pest nematodes, such as the root-knot nematode, which attack plants, and those that act as vectors spreading plant viruses between crop plants.

Rotation of plants with nematode-resistant species or varieties is one means of managing parasitic nematode infestations. For example, marigolds, grown over one or more seasons can be used to control nematodes. Another treatment is with natural antagonists such as fungi.

Major problems currently exist with crops such as soybeans, corn, sugar beets, potatoes, and tomato crops, among others. The golden nematode *Globodera rostochiensis* is a particularly harmful variety of nematode pest that has resulted in quarantines and crop failures worldwide. About ninety percent of nematodes reside in the top 15 centimeters of soil.

THE INVENTION

Thus, what is described and claimed herein is a method of controlling nematodes in agricultural crops, said method comprising contacting said nematodes with an aqueous solution of 3-(trimethoxy-silyl)propyldimethyl-octadecyl ammonium chloride, and, a surfactant.

DETAILED DESCRIPTION OF THE INVENTION

There are at least three methods of contacting the nematode with a composition of this invention. The first is to treat the crop seed with an aqueous solution of the composition and allowing the seed to dry. When planted, and the nematode migrates to the seed, the nematode would be affected by the composition.

In a second embodiment, an aqueous solution of the composition of this invention can be sprayed onto the soil or into the soil containing the crop.

In yet a third embodiment, the plant itself can be sprayed with an aqueous solution of the composition of this invention.

Most nematodes affecting crops are dioecious, with separate male and female individuals. Many nematodes have an egg stage, four juvenile stages, and an adult male and female stages. From juvenile 1 stage to adult development, during each development stage, the nematode undergoes a molt, that is, shedding an outside cuticle, and forming a new cuticle. The compositions of this invention cause the second juvenile state to repeatedly molt until that stage dies. In addition, the compositions cause the egg hatch rate to be significantly reduced.

The material 3-(trimethoxysilyl)-propyldimethyloctadecyl ammonium chloride is available from Dow Silicones, Midland Mich. as DC-5700. For this invention, it is used at 0.005 to 3.0 weight percent based on the weight of the water and 3-(trimethoxysilyl)-propyldimethyl-octadecyl ammonium chloride.

A surfactant that is useful in this composition is DC-193 which is a polysiloxane/glycol copolymer also available from Dow Silicones, Midland, Mich.

EXAMPLES

Different developmental stages of soybean cyst nematode were targeted for treatment in soil. Soybean cyst nematode has an egg stage, four juvenile stages (samples J1 to J4), adult male and female stages. From J1 to adult development, during each development stage, the nematode undergoes a molt, that is, a shedding of the outside cuticle and forming a new cuticle.

Ten freshly hatched J2s were removed from pure culture and added to three different concentrations (0.5 weight %, 0.24 weight %, and 0.12 weight % of Composition solution in a 3 mm Petri dish containing DI water. Composition is $(CH_3O)_3Si(CH_2)_3N^+ \, C_{18}H_{37}(CH_3)_2 \, Cl^-$.

Observations were made over time under an inverted microscope and compound microscope and for both soybean cyst nematode in Composition and also in just DI water which were replicated three times.

Results:

After one day in the Composition in all concentrations, the Composition accumulates on the cuticle of J2s. On the second day, J2s shed the cuticle. J2s will shed their cuticle more than once; the process of Composition accumulation and subsequent molting continued until the nematode died. By the sixth day, most of the nematodes in the DI water also died, but the shapes of the nematodes dying in the Composition in all concentrations was different. Cuticle provides the shape in nematodes, and in normal cases nematodes molt when they need to develop from one stage to another, for example from J2 to J3 stage.

Therefore, due to differences in observed cuticle shape, the molting caused by the composition from the second day disrupted the biology of the nematode. If the same things happens in soil conditions, nematodes may not be able to move, find a host, or penetrate the soybean root and further develop. Statistics were run on the nematodes with the covered cuticles versus treatment and dead nematodes versus treatment. Results indicate that the Composition significantly affects the soybean cyst nematode J2s in all tested concentrations. See Table 1 and 2.

TABLE 1

| SOURCE | df | Adj SS | Adj MS | F value | P value |
|---|---|---|---|---|---|
| Covered J2 vs Treatment | 3 | 122.83 | 40.94 | 146.35 | 0.0 |

TABLE 1-continued

| SOURCE | df | Adj SS | Adj MS | F value | P value |
|---|---|---|---|---|---|
| Dead J2 vs Treatment | 3 | 10 | 3.33 | 10 | 0.009 |

TABLE 2

| TREATMENT | MEAN SCN Dead J2s | GROUPING | MEAN SCN Covered Cuticle | Grouping |
|---|---|---|---|---|
| Control | 5.66 | B | 0 | B |
| 0.12% | 6.66 | B | 5.3 | A |
| 0.25% | 7.66 | A | 5.16 | A |
| 0.5% | 8.00 | A | 5.16 | A |

Conclusions: Use of the active, Composition resulted in cuticle disruption and therefore accelerated molting of the nematode in vitro and ultimate death of the nematodes.

What is claimed is:

1. A method of controlling nematodes in agricultural crops, said method consisting of contacting said nematodes with an aqueous solution consisting of 3-(trimethoxysilyl) propyldimethyloctadecyl ammonium chloride and a surfactant.

2. A method as claimed in claim 1 wherein the agricultural crop is corn.

3. A method as claimed in claim 1 wherein the agricultural crop is soybeans.

4. A method as claimed in claim 1 wherein the agricultural crop is sugar beets.

5. A method as claimed in claim 1 wherein the agricultural crop is potatoes.

6. A method as claimed in claim 1 wherein the agricultural crop is tomatoes.

7. A method of controlling nematodes in agricultural crops as claimed in claim 1 wherein the application method is through the soil.

8. A method of controlling nematodes in agricultural crops as claimed in claim 1 wherein the application method is through treating the crop seed.

9. A method of controlling nematodes in agricultural crops as claimed in claim 1 wherein the application method is through treating the plant.

10. The method as claimed in claim 1 wherein the surfactant is present in 50 ppm to 2 weight percent based on the weight of the 3-(trimethoxysilyl)-propyldimethyloctadecyl ammonium chloride.

11. The method as claimed in claim 1 wherein the 3-(trimethoxysilyl)propyldimethyloctadecyl ammonium chloride is present in said water from 0.005 to 3.0 weight percent based on the weight of the water and 3-(trimethoxysilyl)-propyldimethyloctadecyl ammonium chloride.

12. The method as claimed in claim 1 wherein the surfactant is a polydimethylsiloxane/glycol copolymer.

* * * * *